(12) United States Patent
Scherzer (10) Patent No.: US 11,921,494 B2
(45) Date of Patent: Mar. 5, 2024

(54) RAPID AUTOMATION SYSTEM AND METHOD FOR LINE CLEARANCE

(71) Applicant: Raymond H Scherzer, Raleigh, NC (US)

(72) Inventor: Raymond H Scherzer, Raleigh, NC (US)

( * ) Notice: Subject to any disclaimer, the term of this patent is extended or adjusted under 35 U.S.C. 154(b) by 230 days.

(21) Appl. No.: 17/065,591

(22) Filed: Oct. 8, 2020

(65) Prior Publication Data

US 2022/0113708 A1    Apr. 14, 2022

(51) Int. Cl.
  *G05B 19/418*    (2006.01)
  *G06T 7/00*    (2017.01)
  *G06V 10/22*    (2022.01)

(52) U.S. Cl.
  CPC ........ *G05B 19/41805* (2013.01); *G06T 7/001* (2013.01); *G06V 10/22* (2022.01); *G05B 2219/31056* (2013.01); *G06T 2207/20224* (2013.01)

(58) Field of Classification Search
  CPC ........ G05B 19/41805; G05B 19/41875; G05B 2219/31056; G05B 2219/31308; G06T 7/001; G06T 2207/20224; G06T 2207/10016; G06V 10/22; G06V 10/28; G06V 10/44; G06V 20/52; Y02P 90/02
  See application file for complete search history.

(56) References Cited

U.S. PATENT DOCUMENTS

| | | | |
|---|---|---|---|
| 2011/0044528 A1* | 2/2011 | Tsuchiya | G06T 7/001 382/144 |
| 2018/0012377 A1* | 1/2018 | Dayal | H04N 5/2252 |
| 2019/0304099 A1* | 10/2019 | Hever | G06V 10/25 |
| 2020/0160498 A1* | 5/2020 | Coker | G06T 7/001 |
| 2021/0200193 A1* | 7/2021 | Friebe | G06Q 10/06311 |
| 2022/0036528 A1* | 2/2022 | Luo | G06T 7/001 |

FOREIGN PATENT DOCUMENTS

WO    WO-2022074085 A1 *    4/2022

\* cited by examiner

*Primary Examiner* — Edward F Urban
*Assistant Examiner* — Wassim Mahrouka (57) ABSTRACT

An automated line clearance inspection system will enable fast and accurate inspection of packaging equipment lines to reduce or prevent product intermixing. The system includes a set of image capturing devices that are controlled via a central processing unit whereby end run images are compared with control images to determine if a line is cleared.

12 Claims, 9 Drawing Sheets

RAPID AUTOMATION SYSTEM AND METHOD FOR LINE CLEARANCE

FIELD

The disclosure is generally directed towards automated machinery, and more specifically, at a rapid automation system and method for line clearance.

BACKGROUND

Manufacturing companies desire, and in many cases are required by regulations, to ensure that different products manufactured and packaged at different times on the same packaging equipment line are not intermixed. Current best practices and quality assurance systems require what is commonly referred to as a "line clearance" step to fully inspect the packaging equipment line after the completion of one product run and before commencing the next product run.

Packaging equipment lines are generally long and complex with many areas that need inspection. Many of these areas are difficult to inspect to ensure that products from the prior run are cleared before starting the packaging of the next product run. Current inspection processes are manual, time consuming, inefficient and subject to human error, particularly on parts of the line that are difficult to access or view. For example, manual inspection of packaging lines may require removal of shrouds, access covers and/or safety shields in order to be able to visibly inspect hidden areas.

Although companies expend great effort in line clearance, there have been numerous instances when the line clearance step has failed to detect a product from a previous packaging run and the product from the previous run is incorrectly packaged in the following product's packaging run. This causes confusion and, in some cases, danger to the end user if the incorrect product was inadvertently used or packaged.

Thus, there is provided a novel rapid automation system and method for line clearance.

SUMMARY

The disclosure is directed at a novel rapid automation system and method for line clearance. The disclosure assists to detect errors or inconsistencies in product packaging lines.

The present disclosure provides a significant improvement over current manual, line clearance processes. Using image capturing devices installed in all areas that require inspection significantly reduces the time and effort to conduct the inspection and improves the probability of finding errant products. The disclosure makes use of cost effective proven technology that can quickly be installed and tested by local engineering and quality control staff.

In one aspect, there is provided a method of automated line clearance including obtaining a set of end run images from each of a set of image collecting devices; comparing each of the set of end run images with control images from each of the set of image collecting devices; and generating a set of difference images for each of the set of image collecting devices based on the comparison of the set of end run images and the set of control images.

In another aspect, the method further includes generating an inspection report based on the set of difference images for each of the set of image collecting devices. In yet another aspect, the method further includes calibrating each of the set of image collecting devices before obtaining the set of end run images. In another aspect, calibrating each of the set of image collecting devices includes comparing a calibration image of each of the set of image collecting devices with the control images from each of the set of image collecting devices. In yet a further aspect, the method includes before comparing the calibration image, obtaining a set of calibration images from each of the set of image collecting devices.

In another aspect, generating the inspection report includes transmitting the set of difference images to a user display. In a further aspect, the method includes determining if any of the set of difference images pass a predetermined threshold.

In another aspect of the disclosure, there is provided a system for automated line clearance including a set of image collecting devices; a computing device, in communication with the set of image collecting devices, for obtaining images from the set of image collection devices, the images including a set of control images and a set of end run images; and a processor for comparing the set of control images and the set of end run images and generating a set of difference images for transmission to a line operator.

In a further aspect, the images from the set of image collection devices further include a set of calibration images. In another aspect, the processor compares the set of control images with the set of calibration images. In an aspect, the system further includes a database for storing the set of control images and the set of end run images.

In another aspect of the disclosure, there is provided a computer-implemented method for automating line clearance, including under the control of one or more computer systems configured with executable instructions, obtaining a set of end run images from each of a set of image collecting devices; comparing each of the set of end run images with control images from each of the set of image collecting devices; and generating a set of difference images for each of the set of image collecting devices based on the comparison of set of end run images and the set of control images.

BRIEF DESCRIPTION OF THE DRAWINGS

Embodiments of the present disclosure will now be described, by way of example only, with reference to the attached Figures.

FIG. 1b is a schematic diagram of a server component of the system of FIG. 1a;

FIG. 2 is a schematic diagram of an inspection component of the system of FIG. 1a;

FIG. 4d is a flowchart of a method of updating camera information;

DETAILED DESCRIPTION OF THE EMBODIMENTS

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this disclosure, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, Internet-connected wearables such as smart watches and smart eyewear, personal digital assistants, cameras, tablet computers, laptop computers, media players and the like. Electronic devices also may include equipment and other devices that can communicate in an Internet-of-things arrangement. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion below, a client device, server device, virtual machine or container may be referred to simply as a "device" for brevity. Additional elements that may be included in electronic devices will be discussed below.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process. The terms "processor" and "processing device" may refer to any number of processors in a set of processors that collectively perform a set of operations, such as a central processing unit (CPU), a graphics processing unit (GPU), a remote server, or a combination of these.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices. Read only memory (ROM), random access memory (RAM), flash memory, hard drives and other devices capable of storing electronic data constitute examples of memory devices. A memory device may include a single device or a collection of devices across which data and/or instructions are stored.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, the term "imaging device" refers generally to a hardware sensor that is configured to acquire digital images. An imaging device may capture still and/or video images, and optionally may be used for other imagery-related applications. The imaging device may be part of an image capturing system that includes other hardware components. For example, an imaging device can be mounted on manufacturing or packaging equipment or may be mounted onto a wall or ceiling. The imaging device may capture images in the visual, ultraviolet or infra-red wavelengths or use other image capturing technology such as time of flight.

Figure 1A:
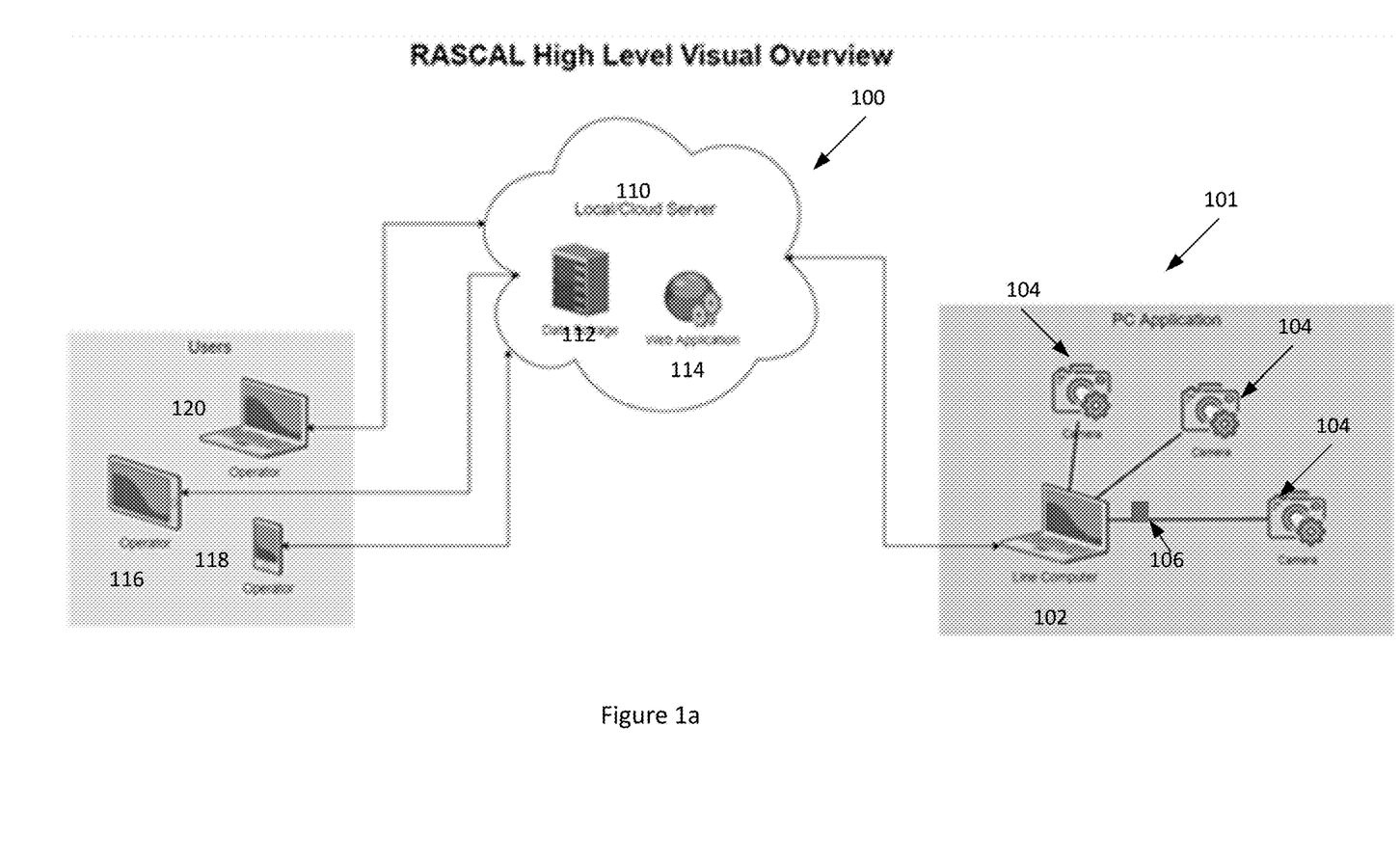
FIG. 1a is a schematic diagram of a rapid automation system for line clearance.

Turning to FIG. 1a, an operational environment for a system for automated line clearance is shown. The system for automated line clearance 100 generally includes an inspection component 101 that includes a computing device 102 and a set of image collecting devices 104. The image collecting devices 104 may include cameras, vision systems (in different wavelengths such as infrared or ultra violet and other technologies such as time of flight, point cloud and patterned illumination) and the like. In the current embodiment, the inspection component 101 further includes a programmable USB switch 106, however, in some embodiments, the switch may not be necessary.

The automated system 100 further includes a server 110, which may or may not be cloud-based, that is on the same network as the inspection component 101. The server 110 may include, or may be connected to, a data storage 112 that stores collected data. The server 110 also executes code to run at least one application 114 to provide assistance in operating the system for line clearance 100. The at least one application 114 allows line operators to wirelessly control all functions of and view all data in the automated system 100 from a user device, such as, but not limited to, a computer tablet 116, a smart phone 118, a line-based computer 120, and the like. In one embodiment, the at least one application may be implemented via a set of modules, such as described below with respect to FIG. 1b.

Although not shown, the system may include an electrical bus that would function as an information highway interconnecting the components of the system. The processor is a central processing device of the system, configured to perform calculations and logic operations required to execute programming instructions.

Information from the bus may be displayed on any of the user device displays or any optional displays in visual, graphic or alphanumeric format. An audio interface and audio output (such as a speaker) also may be provided. Communication with external devices may occur using various communication devices such as a wireless antenna, an RFID tag and/or short-range or near-field communication transceiver, each of which may optionally communicatively connect with other components of the device via one or more communication system. The communication device may be configured to be communicatively connected to a communications network, such as the Internet, a local area network or a cellular telephone data network.

The user devices or any of the hardware components of the system may include a user interface sensor that allows for receipt of data from input devices such as a keyboard, a mouse, a joystick, a touchscreen, a touch pad, a remote control, a pointing device and/or microphone.

Figure 1B:
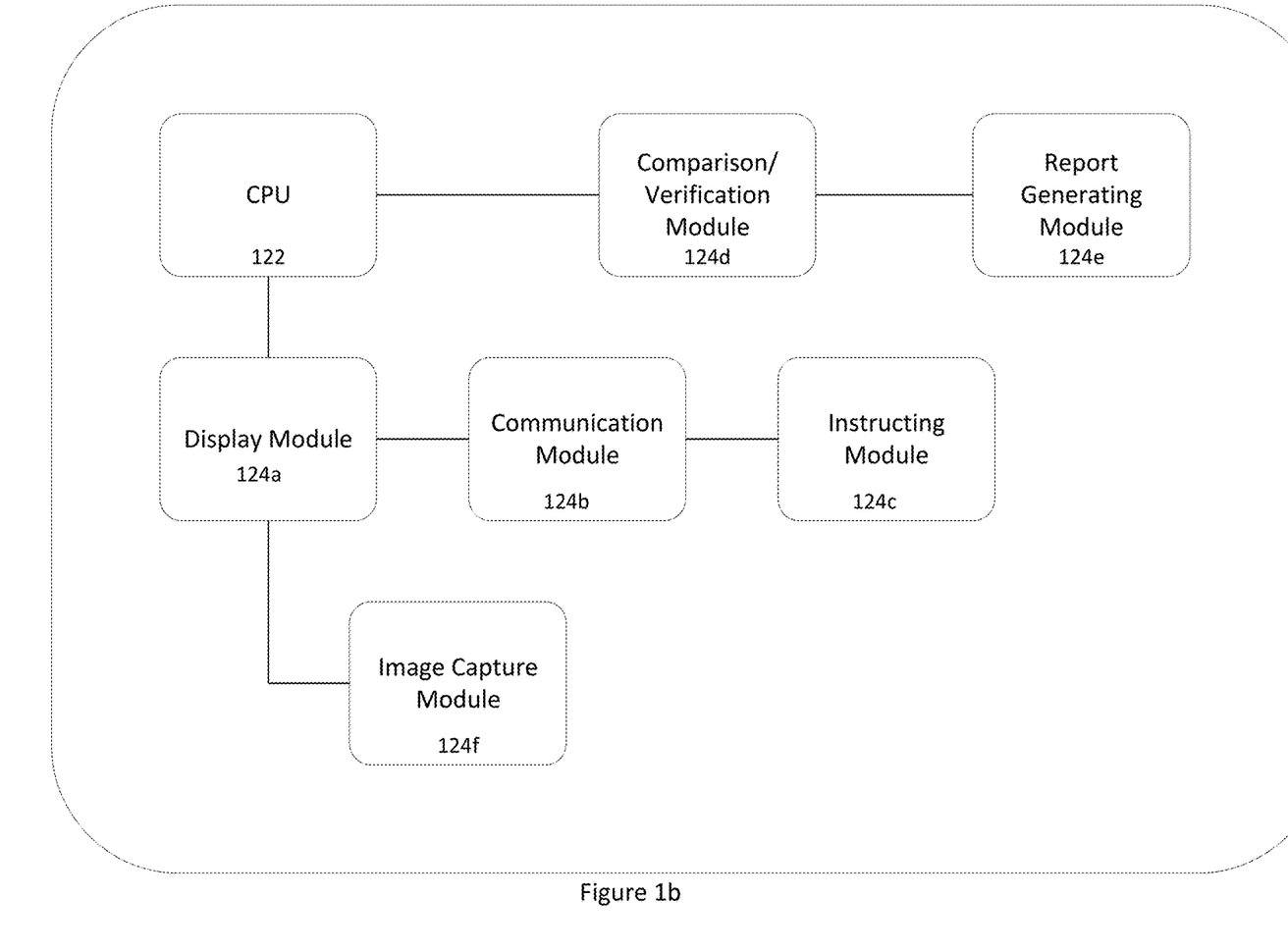

Turning to FIG. 1b, a schematic diagram of a server is shown. In the current embodiment, the server 110 includes a central processing unit (CPU) 122 and a set of modules 124 that include code that provides the functionality for the at least application 114. In the current embodiment, the set of modules 124 include a display module 124a, a communication module 124b, an instructing module 124c, a comparison/verification module 124d, a report generating module 124e and an image capture module 124f. Although various connections between the modules and the CPU are shown, it is understood that other connections between modules are possible and that not all connections are shown in FIG. 1b.

In operation, the display module 124a may generate the images and layouts that are displayed on either the user devices 116, 118 and 120 and/or the computing device 102. The communication module 124b enables communication between the system 100 and the user devices 116, 118 and 120. The instructing module 124c may generate the necessary signals or instructions for transmission to the user devices 116, 118 and 120 and the computing device 102 via the communication module 124b. These instructions may be based on determinations made by the comparison/verification module 124d which compares images that are captured by the system (such as via the image capture module 124f). In one embodiment, the image capture module 124f may obtain calibration images and control images and the comparison/verification module 124d compares these images to verify that the image collecting devices 104 are still calibrated. In another embodiment, the image capture module 124f may obtain end run images and the calibration/verification module 124d may compare these images with the control images. The report generating module 124e may generate reports for display to users, or line operators, based on determinations from the comparison/verification module. Although shown as being stored on the server, some or all of the modules may also be stored within the computing device 102. Alternatively, the server 110 and computing device 102 may store one or more of the same modules.

Figure 2:
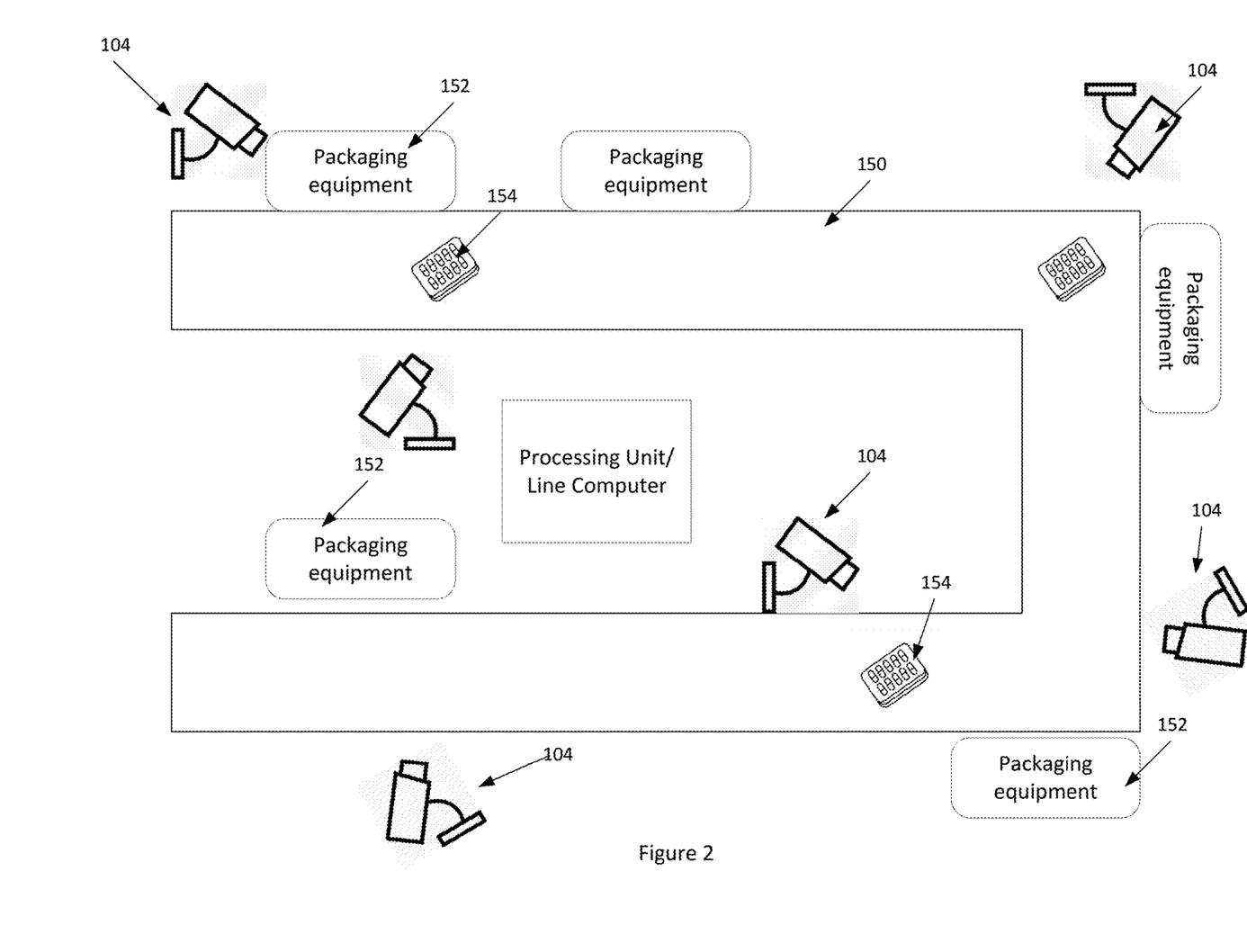

Turning to FIG. 2, a more detailed view of the inspection component 101 for automated line clearance is shown. In one embodiment, the system is implemented within a product packaging environment. In the product packaging environment, the imaging collecting devices 104 are strategically placed in locations that enable the devices 104, collectively, to view all areas of the packaging line (such as conveyor belt 150 and packaging equipment 152) requiring inspection during the line clearance process. The number of devices 104 and exact placement of these devices is typically dependent upon the size and configuration of the packaging equipment on the packaging line. The packaging equipment 152 may be seen as automated machinery for use in the packaging of medical blister or bottle packages 154. In the current embodiment, multiple medical blister or bottle packages 154 are being packaged by the packaging equipment 152 with the image capturing devices 104 capturing the packaging process to reduce or prevent the likelihood of incorrect packaging.

For instance, if the automated machinery is being used to package one type of medication and then a second type of medication, the image capturing devices 104 provide images that can confirm that all of the first product has been cleared from the packaging line before packaging of the second product starts. Alternatively, the image capturing devices may obtain images enabling the system to confirm that the first type of medication has not been erroneously inserted into the packaging for the second type of medication. In another embodiment, the images may confirm that the packaging machinery is completely clear of any of the first medication. The system of the disclosure could also be used to take images of each blister pack before it is sealed and compare to the fiduciary blister pack image for that product to confirm the correct product was filled.

In order to stabilize the positioning of the devices 104, they may be fixed in or mounted to their respective locations to structures on the packaging line, such as via metal clips. Alternatively, they may be mounted to separate structures and directed at the area to be inspected. The devices 104 are communicatively connected to the computing device, or central processing unit (CPU) 102 via a wired or wireless communication link and/or via the USB switch 106.

Figure 3:
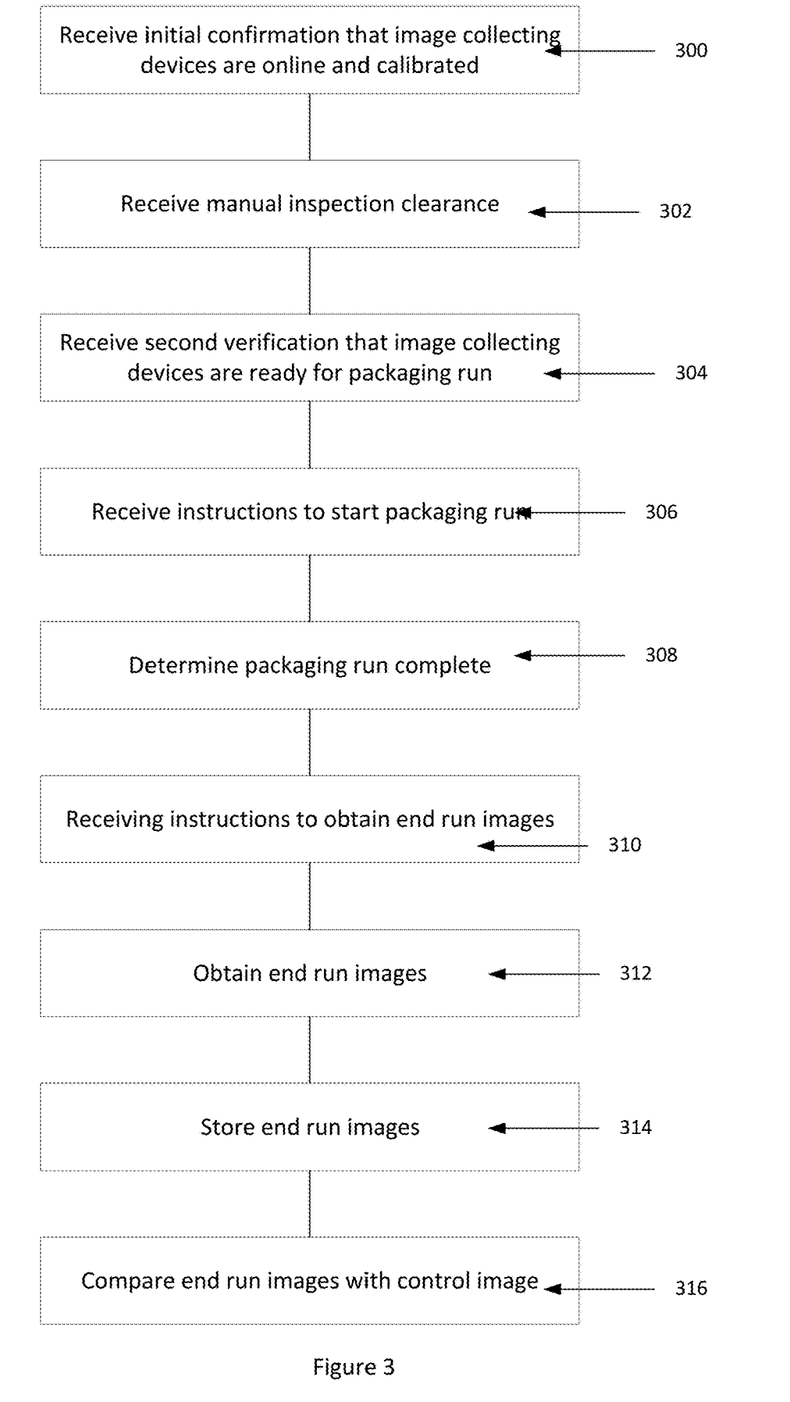
FIG. 3 is a flowchart of a method of automated line clearance.

Turning to FIG. 3, a flowchart outlining a method of automated line clearance is shown. Initially, the system receives confirmation that the image collecting devices are online and calibrated (300). In one embodiment, this may be achieved by having a user, or administrator inputting the number and location of the set of image collecting devices and confirming that the devices are viewing the specified inspection location correctly.

Figure 4A:
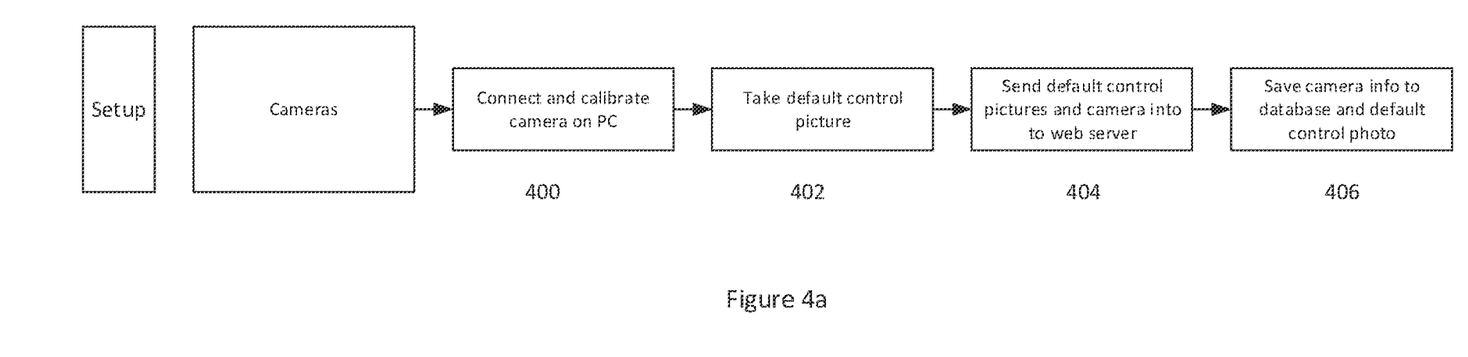
FIG. 4a is a flowchart of a method of camera setup.

In another embodiment, as shown in the flowchart of FIG. 4a, the image collecting devices are connected and calibrated with the processing unit, or line computer 102 (400). The current flowchart is directed at the connection and calibration of a single image collecting device, however, it will be understood that each of the image collecting devices may be connected in a similar manner. A calibration image is then established by the system administrator and the image captured by the image collecting device 104 (402). In one embodiment, the calibration image serves as fiduciary image that captures the correct aperture, field of view and lighting conditions. The calibration image along with image collecting device identification information is then transmitted to the server 110 (404) where the identification information and the calibration image is then stored in the web server (406).

The line operator may then conduct an initial manual inspection of all areas of the packaging line that require a line clearance inspection. The manual inspection is conducted to ensure/confirm that any errant products from previous packaging runs have been removed and that the line is fully cleared before the packaging line is ready for products. The line operator may then enter confirmation that the manual inspection has been cleared into the system (302). Alternatively, the line operator may use comparison software to compare a control image to the calibration image to ensure the line is clear of unwanted products. This may allow a line operator to confirm that the image collecting device settings have not changed since the calibration image was obtained.

Figure 4B:
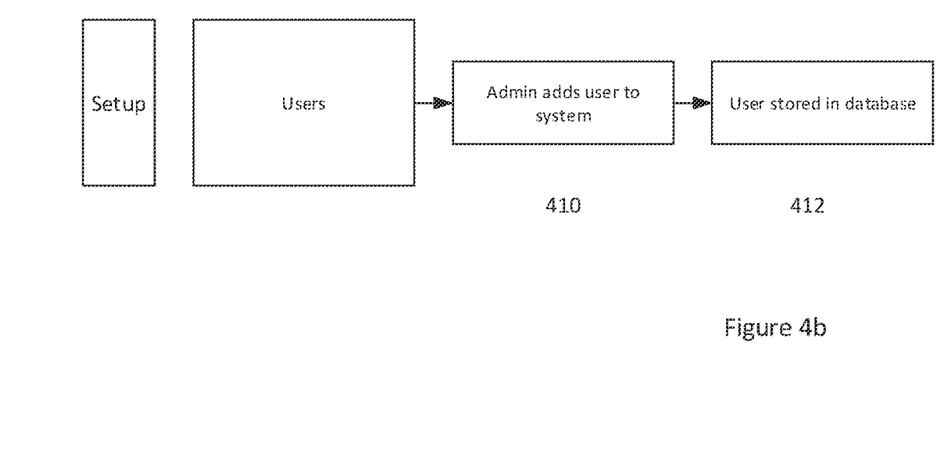
FIG. 4b is a flowchart of a method of user setup.

At times, new line operators may be added to the system, such as schematically shown in FIG. 4*b*.

In order to add new users to the system, an administrator enters line operator information into the system (such as the server 110) (410) whereby the new user information is then stored in the database (412).

After the line operators are authenticated and positioned, the line operator captures a control image with the image collecting device and confirms that the control image represents or is identical to the calibration image, before commencing a packaging run. This allows the line operator to confirm or verify that the image capturing device 104 has the same parameters as the calibration image and represents a proper inspection view. The line operator may also use image analysis program to perform this comparison. In one embodiment, the line operator compares the calibration image with the control image using an analysis program. In some embodiments, the analysis program is stored in the line computer and forms part of the system 100. This comparison ensures/confirms that none of the image collecting devices settings or positions have changed from their viewing position after the initial calibration. In another embodiment, the viewing position for each image collecting device is established by the system administrator who takes a calibration photo that cannot be changed by the line operator. After confirmation that the number and views of the image collecting devices are correct, the line operator inputs the second verification which is received by the system.

Figure 4C:
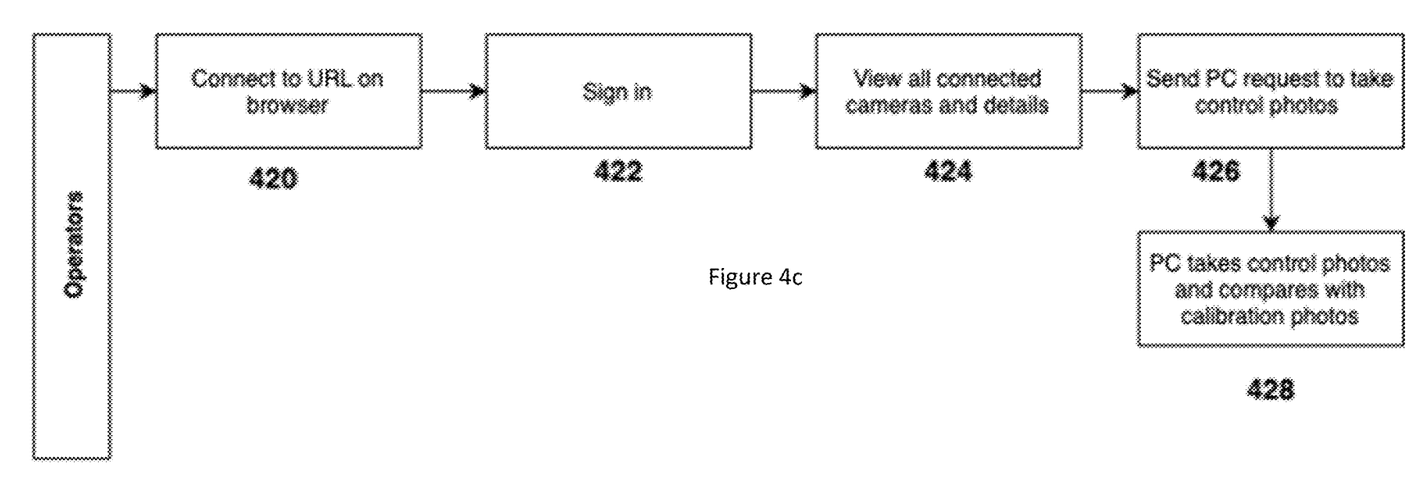
FIG. 4c is a flowchart of user action with respect to a verification check.
Figure 4D:
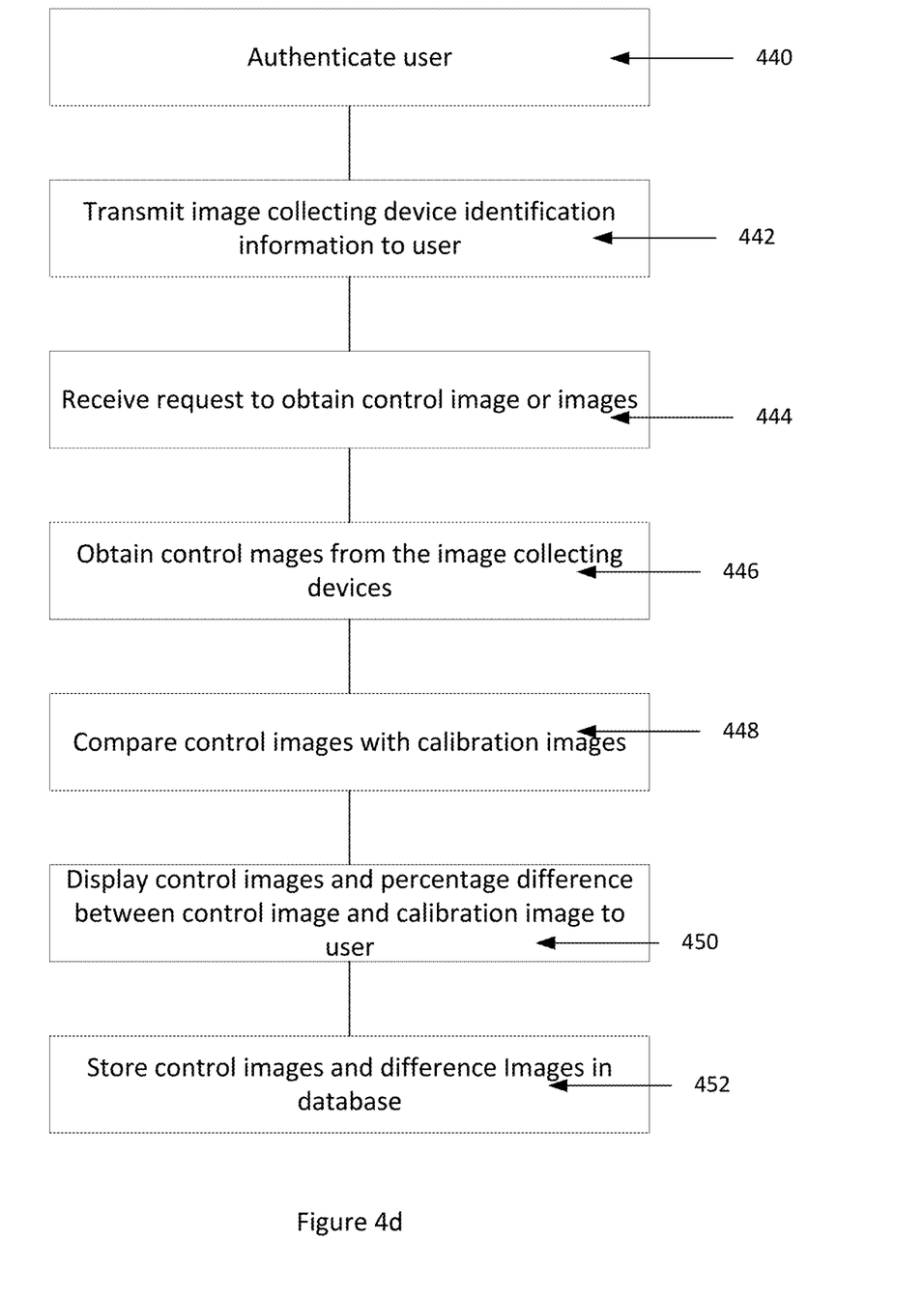
FIG. 4d is a flowchart of a method of performing a verification check.

Another embodiment of performing a second verification is shown schematically in FIG. 4*c* from a user, or line operator, standpoint. The actions of the system are shown in italics and schematically shown in FIG. 4*d*. Initially, the line operator connects to the system via their user computing device (420). The line operator then signs in to the system (422) (authenticate user 440). The user can then view all of the connecting image collecting device and their details (424) (transmit image collecting device identification information to user 442). The line operator can then request the image collecting devices obtain the control image or images (426) (receive request to obtain control image or images 444, obtain control images from the image collecting devices 446) and to compare the calibration image with the control image (428) (compare calibration images with control images 448, display control images and percentage difference between calibration image and control image to user 450, store control images and difference in database 452). Based on the comparison, the line operator can input the second verification or the system can determine that a second verification has been completed if the percentage difference between the calibration image or images and the control image or images is lower than a predetermined threshold.

Alternatively, after the initial manual inspection, the line operator may initialize a line clearance software program or module associated with the computing device to signal each of the image collecting devices 104 to take updated images of the area of the packaging equipment line within such device's 104 view. These updated images of a clear packaging line, before introduction of a product, may be seen as control images. The process of capturing the control pictures begins with the line operator signaling the computing device through any of the user computing devices. The system will then automatically take the control image from each of the image collecting devices as set up by the system administrator. The control images are stored in the database and may be organized by batch number, image description, date and/or time of day. These control images are then compared with the calibration images. Based on the comparison, the line operator can input the second verification or the system can determine that a second verification has been completed if the percentage difference between the calibration image or images and the control image or images is lower than a predetermined threshold.

The system then receives packaging run information. In some embodiments, the packaging run information may be received before receiving the manual inspection clearance or before receiving the second verification (304). In one embodiment, one or more line operators input their identification, the date, product batch number, and identification of the product being packaged on the line into system 100 via the computing device. As discussed above, the user, or line operator may access the system via the user computing device such as, but not limited to, computer tablet 116, smart phone 118 or computer 120.

The line operator can then authorize the product packaging line run to commence (which is received by the system (306), meaning that a new product is introduced to the cleared packaging equipment line and the product is packaged in the appropriate package on the line.

Once the packaging run is complete (308), the line operator stops the packaging equipment line and signals the imaging devices 104 to take end of run images of each respective device's 104 area of inspection in the line clearance process. These instructions are received by the system (310). The system then automatically obtains an end run, or end of run, image from each of the image collecting devices 104 (312). The after, or end, run images are stored in the database (314). The end run images may be organized by batch number, camera 14 description, date and time of day.

A further comparison between the control image and the end run image is then performed by the system (316). Comparison of the end of run images with the control images allows a line operator, or the system, to determine if any or the product from the packaging run has been left behind. If it is determined that some product has been left behind (where the end of run image does not match the control image), the line operator may go to the location identified by the system to clear the product and confirm that it has been cleared.

Figure 5:
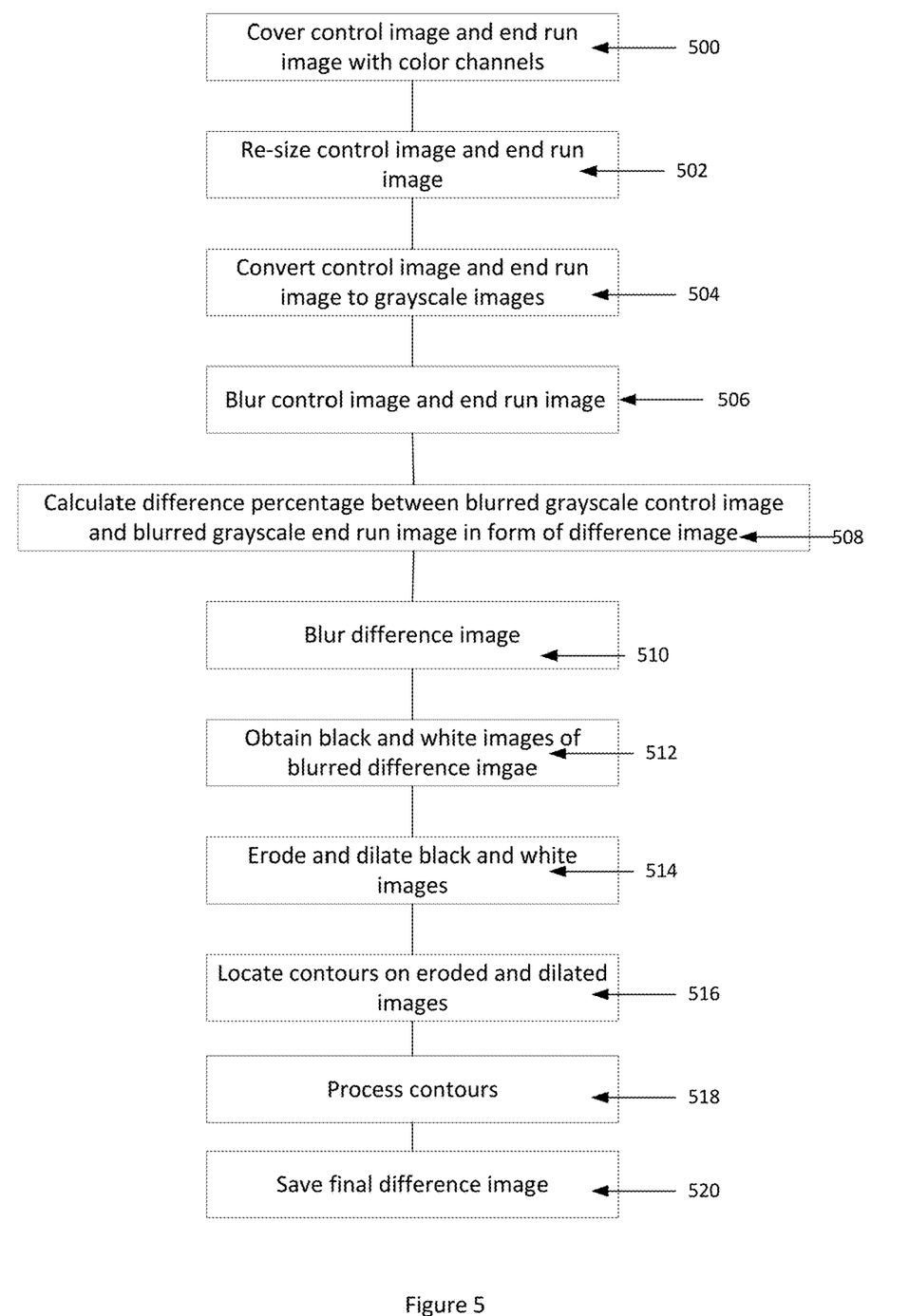
FIG. 5 is a flowchart of a method of comparing images.

In one embodiment, the comparison between the control image and the end run image may be performed as schematically shown in the flowchart of FIG. 5. It will be understood a similar method may be executed for the comparison between the calibration image and the control image. In one embodiment, the comparison/verification module may perform the comparison.

After each series of image capturing events, the control images and their corresponding end run, or end of run images are stored. In one embodiment, the images are stored (314) as 24 bit hexadecimal data from each photo sensor (pixel) that is part of the image collecting device (500). Each photo sensor has 3-8 bit color channels, with each channel having a value between 0 and 255, with 0 being totally black and 255 totally white, with all of the colors in between represented by the standard ANSI values. The images are then re-sized to a predetermined size (502). In one embodiment, the width may be selected as 200 pixels while the height is based on a height/width ratio of the control image. This re-sizing reduces the noise of the image during image processing. The images can then converted to grayscale images (504) to reduce the effects of lighting condition and to make the colour of the packaging and/or product irrelevant in the image comparison. The images can then be blurred (506). In one embodiment, the blurring may be performed by using a two-dimensional (2D) convolution averaging filter, for example a 5×5 convolution averaging filter. Blurring may also be performed by using a Gaussian blur filter or other blur filters.

A difference percentage between the control image and the end run image may then be calculated (508). In one embodiment, the difference in the images (or a difference image) may be calculated or generated using a structural similarity index measure (SSIM) or using a mean square error (MSE) method. SSIM is preferred since, unlike MSE, SSIM uses more advanced statistical parameters in order to find a better difference image based on the actual shapes and structures in the image rather than just the pixels.

The difference image is then blurred (510) such as with a process disclosed with respect to (506). A black and white image with only outlines of difference is then obtained (512). In one embodiment, two pure black and white images with only outlines of differences are obtained using 1) the Otsu threshold and 2) a simple binary threshold. The simple binary threshold checks if a grayscale pixel is within a certain given range and, if it is, makes the pixel black otherwise, it makes it white. The Otsu threshold uses the mean and variance of the images pixels to calculate a range and then does the same thing as the simple binary threshold. This process is called image thresholding. The two thresholded (Otsu and single binary threshold) images are then eroded and dilated (514). Erosion and dilation of an image are morphological transformations that process an image based on the shape of the image. These transformations are useful for getting rid of noise in the image. Erosion causes all of the features of the image to shrink, especially those with no connecting shapes. This causes singled out noise to disappear from the image. Dilation causes all of the features of the image to grow. After the noise is wiped out, dilation helps the main differences in the images to grow back to their regular sizes. Contours are then located on the eroded and dilated images (516). In one embodiment, the eroded and dilated Otsu thresholded image is processed to find rectangular contours around the differences. If there are an unusually large number of contours, it is likely that the Otsu thresholding has grabbed a lot of noise. If this is the case, the simple binary thresholded image is used to find the contours.

The contours are then processed (518). In one embodiment, the rectangular contours are located, scaled up and transformed so they are in the right position on the original difference image. If there are any contours fully inside other contours, these are removed. The final produced difference image is then saved (520). The difference image may then be transmitted as an inspection report. Each image collecting device will have its own difference image and any differences are highlighted. The image differences are summarized in the inspection report for that product batch and stored in the data storage.

The line operator can then review the inspection report and inspect the areas that the system highlights as containing a difference between the control image and the end run image and notes whether actions were taken to clear out products left over from the run or confirms that no foreign products were detected. The summary pictures and report aid the line operator in rapidly and completely inspecting each area of the line to detect any errant products before the next product is introduced to the packaging equipment line.

The final inspection report including comparison and summary pictures may be stored in an electronic format in the data storage (314) associated with the line computing device.

Figure 4E:
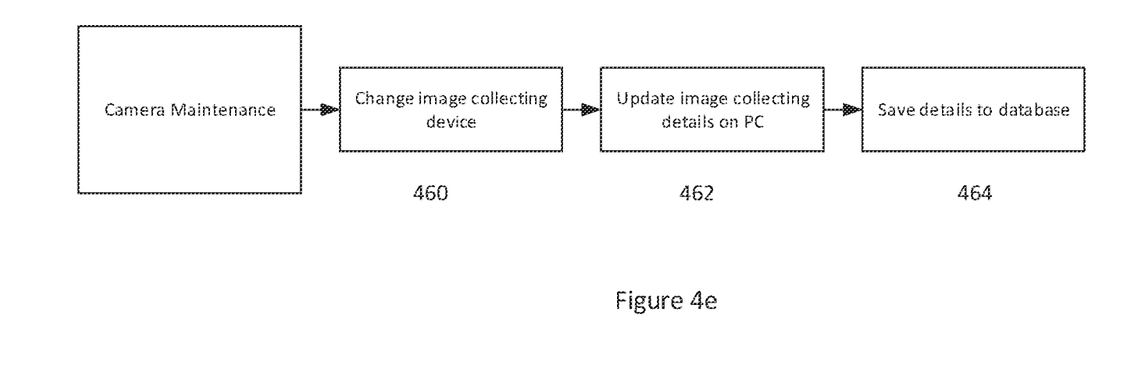
FIG. 4e is a flowchart of a method of camera maintenance.

Turning to FIG. 4e, a method of updating image collecting device information is shown. Initially, a change or update in the information associated with an image collecting device is sensed (460). The updated image collecting device information is then stored on the processing unit 102 (462). The database 112 is then updated with the new image collecting device information (464).

Figure 4F:
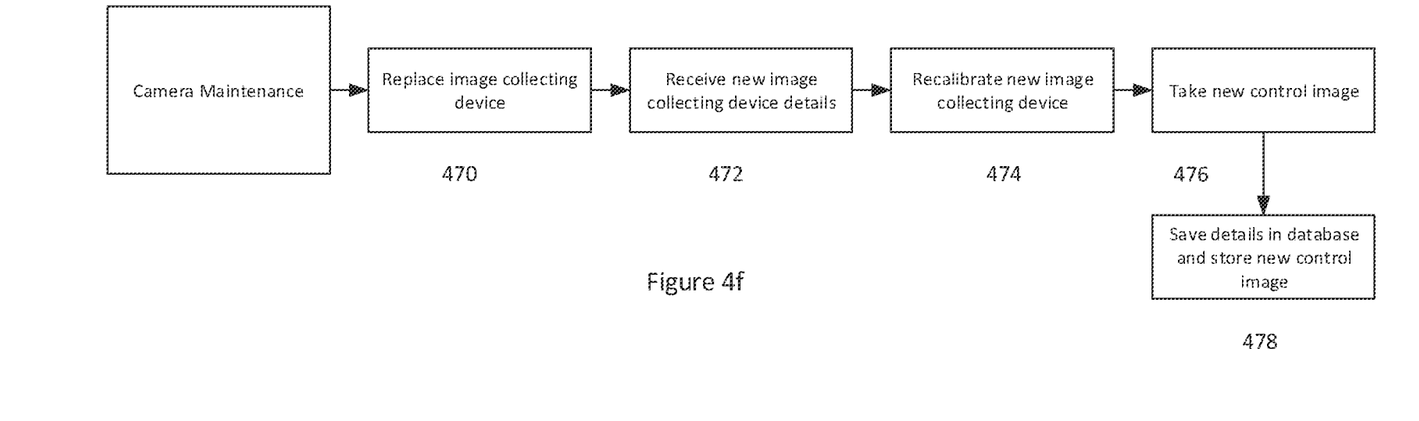
FIG. 4f is a flowchart outlining a method of image collecting device maintenance.

Turning to FIG. 4f, a flowchart outlining a method of image collecting device maintenance is shown. The system initially receives an indication that an image collecting device is to be replaced (470). The new image collecting device details are then received (472). The new image collecting device is then calibrated (474). This may be performed by a user who then confirms the new image collecting device has the same image as the calibration image. This is performed by the system by obtaining and comparing calibration images and control images from the new imaging device. Alternatively, this may be performed as a combination of both user action and system function. In the current embodiment, the system obtains a new control image (476) and then stores the image collecting device details and the control image in the database (478).

While certain embodiments of the disclosure have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the present disclosure. For example, the present system 100 is not limited to use on a packaging line. Rather, the system may also be easily adapted for use on a manufacturing line to rapidly detect flaws in products on the manufacturing line. Also, the system 100 as described above may utilize various types of systems for detecting changes on the line, such as differing light frequencies (infrared and ultraviolet), time of flight technology, point cloud, and patterned illumination. Additionally, various types of off the shelf imaging devices may be utilized. Exemplary image collecting devices 14 include SVPRO 5-50 mm varifocal lens 1080p Sony IMX low illumination machine vision industrial mini USB cameras. The variable focus lens of these image collecting devices 104 adjusts for varying distances and light conditions. An exemplary USB switch is the type of switch distributed by Acronmae, Inc.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments or elements thereof described herein are implemented as a software routine, hardware circuit, firmware, or a combination thereof.

The above-described embodiments are intended to be examples only. Alterations, modifications and variations can be effected to the particular embodiments by those of skill in the art without departing from the scope, which is defined solely by the claims appended hereto.

What is claimed is:

1. A method of automated line clearance for use in medical packaging comprising:
    obtaining a set of end run images after packaging of a first medical item from each of a set of image collecting devices;
    comparing each of the set of end run images with control images from each of the set of image collecting devices; and
    generating a set of difference images for each of the set of image collecting devices based on the comparison of the set of end run images and the set of control images;
    wherein the set of difference images include an Otsu threshold set of difference images and a binary threshold set of difference images.

2. The method of claim 1 further comprising:
    generating an inspection report based on the set of difference images for each of the set of image collecting devices.

3. The method of claim 1 further comprising:
    calibrating each of the set of image collecting devices before obtaining the set of end run images.

4. The method of claim 3 wherein calibrating each of the set of image collecting devices comprises:
    comparing a calibration image of each of the set of image collecting devices with the control images from each of the set of image collecting devices.

5. The method of claim 4 further comprising, before comparing the calibration image, obtaining a set of calibration images from each of the set of image collecting devices.

6. The method of claim 2 wherein generating the inspection report comprises: transmitting the set of difference images to a user display.

7. The method of claim 6 further comprising:
    determining if any of the set of difference images pass a predetermined threshold.

8. A system for automated line clearance for use in medical packaging comprising:
    a set of image collecting devices;
    a computing device, in communication with the set of image collecting devices, for obtaining images from the set of image collection devices, the images including a set of control images and a set of end run images; and
    a processor for comparing the set of control images and the set of end run images and generating a set of difference images for transmission to a line operator;
    wherein the set of difference images include an Otsu threshold set of difference images and a binary threshold set of difference images.

9. The system of claim 8 wherein the images from the set of image collection devices further comprise a set of calibration images.

10. The system of claim 9 wherein the processor compares the set of control images with the set of calibration images.

11. The system of claim 8 further comprising a database for storing the set of control images and the set of end run images.

12. A computer-implemented method for automating line clearance for use in medical packaging, comprising:
    under the control of one or more computer systems configured with executable instructions,
    obtaining a set of end run images from each of a set of image collecting devices;
    comparing each of the set of end run images with control images from each of the set of image collecting devices; and
    generating a set of difference images for each of the set of image collecting devices based on the comparison of set of end run images and the set of control images;
    wherein the set of difference images include an Otsu threshold set of difference images and a binary threshold set of difference images.

* * * * *